United States Patent
Kitazawa et al.

(10) Patent No.: US 6,645,279 B1
(45) Date of Patent: Nov. 11, 2003

(54) BAKED COLORED PENCIL LEAD AND PROCESS FOR PRODUCING THE SAME

(75) Inventors: Katsunori Kitazawa, Takasaki (JP); Masaaki Hoshiba, Takasaki (JP); Noboru Kanba, Gunma (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/868,952

(22) PCT Filed: Dec. 24, 1999

(86) PCT No.: PCT/JP99/07272

§ 371 (c)(1), (2), (4) Date: Jun. 20, 2001

(87) PCT Pub. No.: WO00/39227

PCT Pub. Date: Jul. 6, 2000

(30) Foreign Application Priority Data

Dec. 25, 1998 (JP) ............................................. 10-370071

(51) Int. Cl.⁷ ................................................. C09D 11/13
(52) U.S. Cl. ..................................................... 106/31.11
(58) Field of Search ....................................... 106/31.11

(56) References Cited

U.S. PATENT DOCUMENTS

| | | | | |
|---|---|---|---|---|
| 5,595,589 A | * | 1/1997 | Hoshiba et al. | 106/31.11 |
| 5,645,629 A | * | 7/1997 | Kitazawa et al. | 106/31.11 |
| 5,733,482 A | * | 3/1998 | Hoshiba | 264/29.1 |
| 5,911,814 A | * | 6/1999 | Kitazawa et al. | 106/31.11 |

FOREIGN PATENT DOCUMENTS

| | | | | |
|---|---|---|---|---|
| JP | 59-218896 | 12/1984 | ............ | B43K/19/02 |
| JP | 8-048931 | 2/1996 | ............ | C09D/13/00 |
| JP | 9-208878 | 8/1997 | ............ | C09D/13/00 |
| JP | 10-237377 | 9/1998 | ............ | C09D/13/00 |
| JP | 10-237378 | 9/1998 | ............ | C09D/13/00 |
| JP | 11-35871 | 2/1999 | ............ | C09D/13/00 |
| JP | 11-035871 | 2/1999 | ............ | C09D/13/00 |

* cited by examiner

*Primary Examiner*—Mark L. Bell
*Assistant Examiner*—Veronica F. Faison
(74) *Attorney, Agent, or Firm*—Darby & Darby

(57) ABSTRACT

A process for producing a baked color pencil lead, comprising dipping a white or pale color porous baked lead having a volume-based median pore diameter of 0.27 μm or less in a dye ink and then applying a pressure of 1.5 MPa or more thereto to impregnate pores of the above baked lead with the dye ink, in particular, a process for producing a baked color pencil lead, comprising impregnating the pores thereof with a dye ink solution containing as the solvents 35 to 90% by weight of at least one of non-volatile solvents represented by the following Formulas (I) to (III) based on the ink solution and a low boiling organic solvent by applying pressure and then drying the above low boiling organic solvent, and a color pencil lead obtained by the above process:

$$CH_3(CH_2)_7CH=CH(CH_2)_7CH_2OH \quad (I)$$

$$R_1O(CH_2CH_2O)_nH \quad (II)$$

in Formula (II), $R_1$ represents decanoyl, undecanoyl, lauroyl, tridecanoyl or oleoyl, and n is 4.5 to 15; and $$R_2-O-(CH_2CH_2O)_mH \quad (III)$$

in Formula (III), $R_2$ represents decyl, undecyl, lauryl, tridecyl or oleyl, and m is 1 to 14.

8 Claims, No Drawings

BAKED COLORED PENCIL LEAD AND PROCESS FOR PRODUCING THE SAME

TECHNICAL FIELD

The present invention relates to a baked color pencil lead which is excellent in mechanical strength such as flexural strength while having a vivid coloring property and sufficiently high density in drawn lines and which can readily be erased lines drawn therewith with an eraser and is suited particularly to a color pencil lead for a mechanical pencil and in which a baked lead is impregnated with an ink, and to a process for producing the same.

BACKGROUND ART

High mechanical strength, a good coloring property and high density in drawn lines are required as important characteristics of a color pencil lead.

In a conventional baked color pencil lead, at least one kind of clay and the like is used as a binder, and a filler such as boron nitride and, if necessary, a heat resistant pigment and a reaction accelerating agent are added thereto and blended to prepare a blend composition. The blend composition is kneaded and extrusion-molded. Then, it is subjected to heat treatment to become a porous baked lead, and an ink comprising a dye and a pigment is filled into pores of the lead to prepare a color pencil lead.

However, the existing situation is that conventional baked color pencil leads are not sufficient in mechanical strength and that those which are sufficient in density of drawn lines and a coloring property have not yet been obtained.

A baked lead using clay as a binder has so far been weak in sintering force between a filler such as boron nitride and a binder such as clay, and further clay itself has low strength, so that the resulting baked color pencil lead has not attained practical strength. Further, clay contains impurities, and therefore the resulting baked lead is usually colored and exerts an adverse effect on a coloring property of the drawn lines. In particular, it causes a dull color in the drawn lines of a pale color base. Accordingly, in order to meet the requirement described above, an increased amount of ink is filled into a lead which is allowed to have a large porosity while maintaining satisfactory mechanical strength.

Proposed by the present inventors as a method for solving the problems described above are a baked color pencil lead prepared by impregnating a perhydropolysilazane solution into pores of a specific porous baked lead obtained by subjecting at least a filler to heat treatment, subjecting it to heat treatment in an inert atmosphere such as a nitrogen atmosphere or in an ammonia gas atmosphere to thereby obtain a lead in which silicon nitride is formed as a binder and filling an ink into this lead, and a process for producing the same (Japanese Patent Application Laid-Open No. 48931/1996).

Also, proposed as a method for solving the problems described above are a baked color pencil lead provided with specific pores by using a filler having a specific particle diameter, and a process for producing the same (Japanese Patent Application Laid-Open No. 208878/1997).

Further, proposed by the present inventors are a baked color pencil lead in which pores are impregnated with an ink containing oleyl alcohol, specific polyoxyethylene fatty acid ester, specific polyoxyethylene alkyl ether and polyoxyethylene oleyl ether, and a process for producing the same (Japanese Patent Application Laid-Open No. 237377/1998, Japanese Patent Application Laid-Open No. 237378/1998 and Japanese Patent Application No. 188299/1997).

However, these color pencil leads have the problem that setting a pore diameter small in order to strengthen the lead makes it difficult to charge fine pores of the lead with an ink and as a result, a difference in a density and a hue is produced between the tip part and the middle part.

An object of the present invention is to solve the problems of the conventional baked color pencil leads described above and further improve the prior arts of the present inventors described above and to provide a baked color pencil lead which is free of scattering in a density of the color depending on spots of the lead and has extraordinarily excellent mechanical strength and a vivid and excellent coloring property and which is excellent in writing feeling and can readily be erased lines drawn therewith with an eraser, and a process for producing the same.

DISCLOSURE OF THE INVENTION

Intensive researches repeated by the present inventors in order to solve the problems described above have resulted in finding that the above problems can be solved by impregnating a porous baked lead having a specific pore with a specific dye ink under a specific pressure, and thus the present invention has come to be completed.

That is, the baked color pencil lead of the present invention and the production process for the same are constituted by the following items (1) to (6):

(1) A process for producing a baked color pencil lead, comprising forming a white or pale color porous baked lead having a volume-based median pore diameter of 0.27 μm or less, dipping it in a dye ink and then applying a pressure of 1.5 MPa or more thereto to impregnate pores of the above baked lead with the above dye ink.

(2) The process for producing a baked color pencil lead as described in the above item (1), wherein the dye ink impregnated into the pores of the porous baked lead is a dye ink using as a solvent at least one of non-volatile solvents represented by the following Formulas (I) to (III):

$$CH_3(CH_2)_7CH\!=\!CH(CH_2)_7CH_2OH \quad (I)$$

$$R_1O(CH_2CH_2O)_nH \quad (II)$$

in Formula (II), $R_1$ represents decanoyl, undecanoyl, lauroyl, tridecanoyl or oleoyl, and n is 4.5 to 15; and

$$R_2\!-\!O\!-\!(CH_2CH_2O)_mH \quad (III)$$

in Formula (III), $R_2$ represents decyl, undecyl, lauryl, tridecyl or oleyl, and m is 1 to 14.

(3) The process for producing a baked color pencil lead as described in the above item (2), comprising impregnating the pores of the porous baked lead with a dye ink solution using as the solvent 35 to 90% by weight of at least one of the non-volatile solvents represented by Formulas (I) to (III) described above and a low boiling organic solvent by applying pressure and then removing the above low boiling organic solvent by drying.

(4) The process for producing a baked color pencil lead as described in any of the above items (1) to (3), wherein the porous baked lead comprises a colorless or white filler and silicon nitride, which is a binder and is produced by using perhydropolysilazane as a starting material.

(5) A baked color pencil lead obtained by the production process as described in the above item (1). (6) A baked color pencil lead obtained by the production process as described in any of the above items (2) to (4), characterized by involving the dye ink containing 38% by weight or more of at least one of the non-volatile solvents represented by Formulas (I) to (III).

BEST MODE FOR CARRYING OUT THE INVENTION

The embodiment of the present invention shall be explained below in detail.

The baked color pencil lead of the present invention is produced by impregnating pores of a white or pale color porous baked lead having a volume-based median pore diameter of 0.27 μm or less with a dye ink by applying a pressure of 1.5 MPa or more. The ink to be impregnated preferably uses at least one of the non-volatile solvents represented by the following Formulas (I) to (III) as a solvent:

$$CH_3(CH_2)_7CH=CH(CH_2)_7CH_2OH \quad (I)$$

$$R_1O(CH_2CH_2O)_nH \quad (II)$$

in Formula (II), $R_1$ represents decanoyl, undecanoyl, lauroyl, tridecanoyl or oleoyl, and n is 4.5 to 15; and $$R_2-O-(CH_2CH_2O)_mH \quad (III)$$

in Formula (III), $R_2$ represents decyl, undecyl, lauryl, tridecyl or oleyl, and m is 1 to 14.

The baked color pencil lead of the present invention is more preferably produced by forming a white or pale color porous baked lead having a volume-based median pore diameter of 0.27 μm or less, dipping the above porous baked lead in a dye ink solution prepared by dissolving a dye in a mixed solvent of at least one of the non-volatile solvents described above with a low boiling solvent, then applying a pressure of 1.5 MPa or more thereto to impregnate the pores of the above baked lead with the above dye ink solution and then removing the low boiling solvent by drying.

In the present invention, the porous baked lead shall not specifically be restricted in a production process and a structure thereof as long as it has a volume-based median pore diameter of 0.27 μm or less and is white or pale-colored, and it includes, for example, those formed from at least a colorless or white filler and silicon nitride or clay, which is a binder.

Preferably from the viewpoints of mechanical strength such as flexural strength, writing feeling and a hue, the porous baked lead comprises suitably a colorless or white filler and silicon nitride, which is a binder and is produced by using perhydropolysilazane as a starting material. The production process developed by the present inventors described in Japanese Patent Application Laid-Open No. 48931/1996 is desirable as the process for producing the porous baked lead having the characteristics described above by using this perhydropolysilazane as a starting material.

That is, it is a process in which a blend composition comprising at least a filler and an organic excipient is kneaded, extrusion-molded and baked in a non-oxidative atmosphere to thereby form a first baked lead in which carbon formed by carbonization of the above organic exipient is a binder; the above first baked lead is heated in an oxidative atmosphere to oxidize and remove the binder of carbon to thereby form a second baked lead; and a perhydropolysilazane-containing solution is filled into pores of the above second baked lead, and it is subjected to heat treatment in an inert atmosphere such as a nitrogen atmosphere or in an ammonia gas atmosphere to thereby obtain a white or pale color porous baked lead (third baked lead) in which silicon nitride is formed as a binder.

The filler used for forming the porous baked lead described above shall not specifically be restricted, and any ones can be used as long as it has so far been used as a filler for a baked color pencil lead and is colorless and white. For example, boron nitride, talc, mica, alumina and silica can be used, and it is a matter of course that a mixture of two or more kinds thereof can be used as well. When using perhydropolysilazane, boron nitride is preferably used from the viewpoints of heat resistance and others.

In order to control a volume-based median pore diameter of the porous baked lead described above to 0.27 μm or less, preferably 0.07 to 0.25 μm, a filler having a particle diameter of 15 μm or less, preferably 12 μm or less is preferably selected. However, if the filler has a particle diameter of less than 3 μm, the resulting lead has a small abrasion amount in writing and provides hard writing feeling, and therefore the particle diameter is preferably 3 μm or more.

Accordingly, the filler has a particle diameter of preferably 3 to 15 μm, more preferably 3 to 12 μm.

If the porous baked lead has a volume-based median pore diameter exceeding 0.27 μm, the lead has weakened mechanical strength, and therefore such a lead is not preferred.

Considering a balance between a filling amount of the ink and the flexural strength, a porosity of the porous baked lead is controlled preferably to 5 to 35% by controlling an amount of the perhydropolysilazane-containing solution filled into the second baked lead.

In the present invention, the baked color pencil lead is obtained by impregnating and filling pores of the porous baked lead having the pore diameter described above with the dye ink by applying a pressure of 1.5 MPa or more.

In the present invention, the porous baked lead having a volume-based median pore diameter of 0.27 μm or less is used, and therefore using a pressure of less than 1.5 MPa makes it difficult to allow the ink to be impregnated into the middle part of the lead depending on a molecular form of the dye and the kind of a solvent for the ink, so that the ink is impregnated preferably by applying a pressure of 1.5 MPa or more, preferably 2.0 MPa or more.

A method in which the resulting white or pale color porous baked lead is immersed in a solution containing an ink and a pressure is applied with an inert gas such as nitrogen gas or argon gas can be given as an example of a method for applying a pressure.

It is a matter of course that it is possible to reduce the pressure before applying a pressure to accelerate impregnation as well as to heat the solution containing the ink and the lead if necessary.

Capable of being used as the dye ink impregnated into the porous baked lead described above under pressure are conventionally known ones, for example, printing inks, stamp inks, inks for a ballpoint pen and water-based inks for a writing instrument which are usually used and produced by dissolving dyes in oils and solvents such as animal and vegetable oils, synthetic oils, alcohols, hydrocarbon oils and water and further adding, if necessary, resins and surfactants. In particular, preferably used are dye inks using the non-volatile solvents represented by Formulas (I) to (III) described above as the solvents for these inks.

Further, a UV absorber, a light stabilizer and an antistatic agent may be added, if necessary, to the dye ink.

The non-volatile solvents described above can be used in a mixture of two or more kinds thereof as well as alone.

The non-volatile solvent is preferably a primary alcohol from the viewpoints of solubility of the dye and the writing feeling. In particular, oleyl alcohol represented by Formula (I) described above has low volatility and is good as a solvent for the baked color pencil lead because the ink using it has good stability with the passage of time and is excellent in erasability with an eraser and writing feeling.

If $R_1$ in polyoxyethylene fatty acid ester represented by Formula (II) described above which is another preferred solvent and $R_2$ in polyoxyethylene alkyl ether represented by Formula (III) described above which is other preferred solvent have respectively fewer carbon atoms than decanoyl and decyl group described above, inks using them are not sufficient in the writing feeling and the stability with the passage of time which originate in the lubricity and volatility respectively, and therefore they are not preferred.

Further, if they have more carbon atoms than tridecanoyl and tridecyl excluding oleoyl and oleyl, the solvents have low solubility for a dye and is solid at room temperature, though depending on the numbers of n and m, and inks using the solvents cause problems on the erasability with an eraser and the writing feeling originating in an abrasion amount of the lead. Accordingly, such solvents are not preferred.

Further, if n and m are larger than the numbers described previously, the solvents are solid at room temperature, and provided are the problems that an ink using the solvents is inferior in the erasability with an eraser and is liable to erode an NBR-made chuck in a holding part in a mechanical pencil of the lead.

Accordingly, polyoxyethylene fatty acid ester represented by Formula (II) described above and polyoxyethylene oleyl ether and polyoxyethylene alkyl ether represented by Formula (III) are good as the solvent for the baked color pencil lead.

A low boiling organic solvent is preferably added as an auxiliary solvent to the non-volatile solvents represented by Formulas (I) to (III) described above in order to further elevate solubility of the dye.

Any of alcohols, ketones, esters, ethers, aliphatic hydrocarbons and aromatic hydrocarbons can be used as the low boiling organic solvent as long as they are publicly known, available in the market and excellent in compatibility with the non-volatile solvents and solubility for the dye.

From a viewpoint of stability of the resulting color pencil lead with the passage of time, the low boiling organic solvent has to be dried and removed after impregnated into the pores of the porous baked lead by applying pressure. Considering heat resistance of the dye and an energy cost for drying, the low boiling organic solvent having a boiling point of 150° C. or lower is preferably used, and ethyl alcohol and isopropyl alcohol are particularly preferred from a viewpoint of safety.

It is a matter of course that these solvents can be used as well in a mixture of two or more kinds thereof.

The blending amounts of the non-volatile solvent and the low boiling solvent can not generally be determined since the kind and blending amount of the dye and a required amount of the low boiling organic solvent are different depending on the color of the ink. It is preferred in terms of the expected effects thereof to control the non-volatile solvent to 35 to 90% by weight and the low boiling organic solvent to 10 to 30% by weight each based on the dye ink solution.

In the present invention, a content of at least one of the non-volatile solvents represented by Formulas (I) to (III) described above in the dye ink involved in the pores of the porous baked lead after removing the low boiling organic solvent described above is preferably to be 38% by weight or more in order to obtain the intended color pencil lead.

In the case of the ranges of the blending amounts described above, that is, 35 to 90% by weight of the non-volatile solvent and 10 to 30% by weight of the low boiling organic solvent each based on the dye ink solution, a content of the non-volatile solvent in the dye ink after removing the low boiling organic solvent is 38% by weight or more.

Further, the lead filled with the dye ink may be impregnated with the non-volatile solvents represented by Formulas (I) to (III) described above and/or other oils for the purpose of elevating writing feeling.

Any of spirit soluble dyes, oil-soluble dyes, basic dyes and metal-containing dyes can be used as long as they can be dissolved in the non-volatile solvents represented by Formulas (I) to (III), the low boiling solvents described above and in addition thereto, other solvents used, oils and water. It is a matter of course that these dyes can be used together as a mixture of a plurality thereof.

The baked color pencil lead of the present invention thus constituted and the production process for the same have the following effects.

In the baked color pencil lead of the present invention and the production process for the same, provided is the baked color pencil lead which is free of scattering in a density of the color depending on spots of the lead and provided with an even and excellent coloring property in addition to advantages of excellent stability with the passage of time, flexural strength and writing feeling since the pores of the baked lead can be filled with the dye ink in an amount enough for obtaining drawn lines of high density without unevenness by applying pressure.

EXAMPLES

Next, the present invention shall more specifically be explained with reference to examples and comparative examples, but the present invention shall by no means be restricted by the following examples.

Example 1

| | |
|---|---|
| Boron nitride (average particle diaeter: 7 μm) | 40% by weight |
| Vinyl chloride resin | 43% by weight |
| Dioctyl phthalate (DOP) | 16% by weight |
| Oleic amide | 1% by weight |

The blend composition described above was mixed and dispersed by means of a Henschel mixer and kneaded by means of a pressure kneader and two roll mill. Then, it was extrusion-molded into fine lines, and they were subjected to heat treatment at 180° C. in the air in order to remove the residual plasticizer and then heated up to 1000° C. in a nitrogen atmosphere, followed by being baked at 1000° C., whereby a first baked lead was obtained.

This first baked lead was baked at 700° C. in an oxidative atmosphere to remove carbon, whereby a white second baked lead was obtained. This second baked lead was impregnated with a perhydropolysilazane-containing solution at room temperature for a day and then heated up to 1250° C. in a nitrogen atmosphere, followed by being baked at 1250° C., whereby a baked lead was obtained.

The foregoing steps of impregnating of the perhydropolysilazane-containing solution and baking were further repeated once, whereby a white third baked lead having a diameter of 0.57 mm was obtained.

Next, the baked lead described above was immersed in a red ink comprising:

| | |
|---|---|
| Spilon Red C-GH (manufactured by Hodogaya Chemical Co., Ltd.) | 30% by weight |
| Diethylene glycol nonylphenyl ether | 70% by weight | and left standing in an autoclave at 70° C. for 24 hours under applying a pressure of 3.5 MPa. The lead was taken out of the solution, and then the lead surface was washed with ethyl alcohol to obtain a red baked color pencil lead having a diameter of 0.57 mm.

Example 2

The same baked lead (third baked lead) as prepared in Example 1 described above was immersed in a blue solution comprising:

| | |
|---|---|
| Valifast Blue 1605 (manufactured by Orient Chemical Ind. Ltd.) | 15% by weight |
| Ethyl alcohol | 25% by weight |
| Polyoxyethylene lauryl ether (m = 4.5) | 60% by weight | and left standing in an autoclave at room temperature for 24 hours under applying a pressure of 2.2 MPa.

The lead was taken out of the solution and then dried at 80° C. to remove ethyl alcohol, thereby obtaining a light blue baked color pencil lead having a diameter of 0.57 mm.

Example 3

The same baked lead (third baked lead) as prepared in Example 1 described above was immersed in a blue solution comprising:

| | |
|---|---|
| Valifast Blue 1605 (manufactured by Orient Chemical Ind., Ltd.) | 15% by weight |
| Ethyl alcohol | 25% by weight |
| Oleyl alcohol | 60% by weight | and left standing in an autoclave at room temperature for 24 hours under applying a pressure of 2.2 MPa.

The lead was taken out of the solution and then dried at 80° C. to remove ethyl alcohol, thereby obtaining a light blue baked color pencil lead having a diameter of 0.57 mm.

Comparative Example 1

The same baked lead (third baked lead) as prepared in Example 1 described above was immersed in the same red ink as used in Example 1 and left standing at 70° C. for 24 hours at an atmospheric pressure. Further, the lead surface was washed with ethyl alcohol in the same manner as in Example 1 to obtain a red baked color pencil lead having a diameter of 0.57 mm.

Comparative Example 2

The same baked lead (third baked lead) as prepared in Example 1 described above was immersed in the same blue solution as used in Example 2 and dyed in the same manner, except that a pressure of the autoclave was changed to 1.0 MPa, thereby obtaining a light blue baked color pencil lead having a diameter of 0.57 mm.

Comparative Example 3

The same procedure as in Example 2 was repeated, except that boron nitride having an average particle diameter of 17 μm was used, thereby obtaining a light blue baked color pencil lead having a diameter of 0.57 mm.

The baked color pencil leads prepared in Examples 1 to 3 and Comparative Examples 1 to 3 were measured for a flexural strength, a volume-based median pore diameter, a porosity and scattering in dyeing based on JIS-6005-1989 and evaluated.

TABLE 1

| | Flexural strength MPa[1] | Volume-based median pore diameter μm[2] | Porosity %[2] | Scattering in dyeing[3] | | |
|---|---|---|---|---|---|---|
| | | | | V value at tip part | V value at middle part | Visual observation |
| Example 1 | 253.0 | 0.15 | 21 | 6.43 | 6.35 | None |
| Example 2 | 253.7 | 0.15 | 21 | 7.10 | 7.13 | None |
| Example 3 | 251.5 | 0.15 | 21 | 7.85 | 7.82 | None |
| Comparative Example 1 | 251.4 | 0.15 | 21 | 6.46 | 9.06 | Present |
| Comparative Example 2 | 250.9 | 0.15 | 21 | 7.66 | 9.10 | Present |
| Comparative Example 3 | 148.8 | 0.32 | 23 | 6.64 | 6.62 | None |

[1] Average value of a flexural strength of the lead after dyeing measured based on JIS-S-6005-1989
[2] The third baked lead before dyeing was measured by means of a mercury porosimeter.
[3] In scattering in dyeing, a tip of the lead and a portion obtained by breaking it at a middle thereof were used for mechanical writing on PPC paper at a load of 5N, and the V value of the drawn line density was measured by means of a spectrocolorimeter MSC-5N manufactured by Suga Test Instruments Co., Ltd. Further, the presence of scattering in dyeing in the drawn lines was visually observed.

Comments on Results Summarized in Table 1

As apparent from the results shown in Table 1, it has been found that the baked leads prepared in Examples 1 to 3 falling in the scope of the present invention have a high flexural strength and can be used as a color pencil lead for a mechanical pencil and that scattering in dyeing is scarcely observed.

In contrast with this, the baked leads prepared in Comparative Examples 1 and 2 falling outside the present invention were not sufficiently dyed due to a smaller pressure in dyeing and remained white in a middle part though the tips and the surfaces of the leads were dyed. Also, the baked lead prepared in Comparative Example 3 had a large pore diameter because of a larger particle diameter of boron nitride and had a low strength, so that it was susceptible to breaking for a color pencil lead for a mechanical pencil, though it provided drawn lines having high density.

Erasability of drawn lines with an eraser was good in all cases of Examples 1 to 3 and Comparative Examples 1 to 3.

INDUSTRIAL APPLICABILITY

The baked color pencil leads of the present invention are excellent in mechanical strength and scarcely breakable in practical uses, and they are useful as a color pencil lead which is very excellent in a coloring property, writing feeling and erasability of drawn lines with an eraser. In particular, they are suited to a color pencil lead for a mechanical pencil.

What is claimed is:

1. A process for producing a baked color pencil lead, comprising forming a white or pale color porous baked lead having a volume-based median pore diameter of 0.27 μm or less, dipping it in a dye ink and then applying a pressure of 1.5 MPa or more thereto to impregnate the pores of the baked lead with the dye ink.

2. The process of claim 1, wherein the porous baked lead comprises a colorless or white filler and silicon nitride, which is a binder and produced by using perhydropolysilazane as a starting material.

3. The process of claim 1, wherein the dye ink impregnated into the pores of the porous baked lead is a dye ink solution using as a solvent at least one of non-volatile solvents represented by the following Formulas (I) to (III):

$$CH_3(CH_2)_7CH=CH(CH_2)_7CH_2OH \qquad (I)$$

$$R_1O(CH_2CH_2O)_nH \qquad (II)$$

$$R_2-O-(CH_2CH_2O)_mH \qquad (III)$$

wherein $R_1$ represents decanoyl, undecanoyl, lauroyl, tridecanoyl or oleoyl; n is 4.5 to 15; $R_2$ represents decyl, undecyl, lauryl, tridecyl or oleyl; and m is 1 to 14.

4. The process of claim 3, comprising impregnating the pores of the porous baked lead with a dye ink solution using as the solvent 35 to 90% by weight of at least one of the non-volatile solvents represented by Formulas (I) to (III) based on the dye solution and a low boiling organic solvent by applying pressure and then removing said low boiling organic solvent by drying.

5. A baked color pencil lead obtained by the process of claim 1.

6. A baked color pencil lead obtained by the process of claim 2.

7. A baked color pencil lead obtained by the process of claim 3.

8. A baked color pencil lead obtained by the process of claim 4, wherein the dye ink contains 38% by weight or more of at least one of the non-volatile solvents represented by Formulas (I) to (III).

* * * * *